UNITED STATES PATENT OFFICE 2,113,729

ABRASIVE MEMBER AND METHOD OF MAKING THE SAME

Dean S. Hubbell, Pittsburgh, Pa., assignor to H. H. Robertson Company, Pittsburgh, Pa., a corporation of Pennsylvania No Drawing. Application February 5, 1937, Serial No. 124,348

4 Claims. (Cl. 51—280)

This invention relates to an abrasive member and method of making the same.

The object of the invention is to produce a novel abrasive member which lends itself to economical production and in which the abrasive particles are bonded together by a novel binder and in a strong, durable manner.

Another object of the invention is to produce a novel abrasive surface upon a preformed member in a simple, economical, and practical manner; and as illustrative of this feature of the invention, production of anti-slip treads for stairs and the like may be mentioned.

Prior to the present invention, various binders have been used in producing abrasive members such as grinding wheels, and these binders fall into two general classes. One class comprises the inorganic binders such as Portland cements and the other class the organic binders, including resins such as bakelite and rubber, shellac and other similar materials. It has heretofore been recognized that Portland cement does not adhere well to the individual abrasive grains, and many attempts have been made to improve this adhesion by the formation of special aggregates. For example, the individual grains have been incorporated in a glass, or other ceramic body, and the aggregate then broken into fragments larger and more irregular than the original grain, to the end that a greater opportunity for gripping might be provided the Portland cement composition. Such procedure, however, has not met with substantial commercial success.

Portland cement compositions are further limited in their usefulness for the above purpose by the fact that they adhere very poorly to other materials and even to other masses of hardened cement. As a result reliance can not be placed upon the adhesion of the Portland cement to other materials to fix the abrasive grains in place and the abrasive grains must be employed in sections sufficiently large and well anchored mechanically to insure their staying in place.

Furthermore Portland cement compositions are not suited for use in thin coatings or adhesive films because of their brittleness and also because of their inability to harden properly in thin sections. This further detracts from the usefulness of such Portland cement compositions in securing abrasive grains to preformed articles.

Of the organic binders such as bakelite, rubber, and the like, the expense involved in the production of the grinding or abrasive elements forms an important consideration in their use; and in addition, the processes of manufacture are such as to require the abrasive elements to be produced in the factory or plant and do not lend themselves to the application of abrasive grains to the surfaces of previously erected objects such as stairs and the like. Magnesium oxychloride cements have heretofore been disqualified for general use for such purpose because they were damaged by water and by contact with materials containing lime and were in addition subject to disruptive increases in volume.

In accordance with the present invention, an improved abrasive member may be produced by utilizing as a binder for the individual abrasive grains a copper-bearing magnesium oxychloride cement of the type forming the subject matter of the United States Letters Patent Nos. 2,058,984; 2,058,985; 2,058,986; 2,058,987 to which reference is made for a complete disclosure thereof. I have found that this cement may be successfully used as such a binder and enables an improved abrasive member to be produced following existing commercial methods employed in the production of similar commercial abrasive members, and results in the production of an abrasive element possessing very satisfactory strength, volume, constancy, and freedom from damage by water or contact with Portland cement or other compositions that contain lime.

The copper-bearing magnesium oxychloride cement compositions above referred to are excellent binders for the individual abrasive grains and in addition form a permanent bond to many other materials such as concrete and masonry of all kinds, wood and fibrous materials, sand blasted glass and others. The possess high strength and resistance to abrasion and can be used satisfactorily in thin films if provision is made to avoid too rapid loss of moisture during the setting or hardening process. In addition they are easily placed because of the plastic nature of their mixes.

The use of Portland cement and similar prior cements as binders for abrasive grains has restricted the application of adhesive grains in the field for the production of abrasive and non-slippery surfaces, but I have discovered that the copper-bearing magnesium oxychloride cement referred to also possesses the ability of adhering well to a large variety of surfaces including wood, preformed cement structures, and the like; and as a result, field operations may be performed to produce the desired abrasive surfaces in a convenient and practical manner. In addition, the cement may be utilized in fluid consistencies, which further increase the field of usefulness.

In order to produce a copper-bearing magnesium oxychloride cement suitable for use in producing the present abrasive member, commercial magnesium oxychloride cement obtainable upon the market or produced according to known processes is, as set forth in my patents above referred to, treated to incorporate in it finely divided copper or finely divided cuprous oxide in an amount less than the amount of the cement and preferably from 3 to 10% and such a cement in a fluid or semi-plastic condition is utilized to coat the abrasive grains and as a binder for securing the grains together to form the abrasive member and also in producing the abrasive surface upon any preformed member to which it is desired to bond a thin layer of the abrasive grains. Thereafter the binder is permitted to harden upon exposure to the air producing an abrasive member characterized by high strength, volume constancy, freedom from damage by water and contact with compositions containing lime.

Having thus described the invention, what is claimed is:

1. An abrasive member comprising particles of abrasive material, and a binder therefor comprising the reaction product of a magnesium oxychloride cement containing in an amount less than the amount of the cement, a reagent selected from the group comprising finely divided copper and cuprous oxide, said abrasive member being characterized by a high strength, volume constancy, freedom from damage by water or contact with compositions containing lime.

2. An abrasive member comprising particles of abrasive material, and a binder therefor comprising the reaction product of a magnesium oxychloride cement containing finely divided copper in an amount less than the amount of the cement, said abrasive member being characterized by a high strength, volume constancy, freedom from damage by water or contact with compositions containing lime.

3. An abrasive surface article comprising a preformed article having firmly bonded to a surface thereof an abrasive layer, said abrasive layer comprising particles of an abrasive material, and a binder and bonding material therefor comprising the reaction product of a magnesium oxychloride cement containing in an amount less than the amount of the cement, a reagent selected from the group comprising finely divided copper and cuprous oxide, said abrasive layer being characterized by a high strength, volume constancy, freedom from damage by water or contact with compositions containing lime.

4. An abrasive surface article comprising a preformed article having firmly bonded to a surface thereof an abrasive layer, said abrasive layer comprising particles of an abrasive material, and a binding and bonding material therefor comprising the reaction product of a magnesium oxychloride cement containing finely divided copper in an amount less than the amount of the cement, said abrasive layer being characterized by a high strength, volume constancy, freedom from damage by water or contact with compositions containing lime.

DEAN S. HUBBELL.